May 4, 1948. C. W. MOTT 2,440,780
LIFTING DEVICE FOR TRACTORS
Filed Dec. 11, 1944
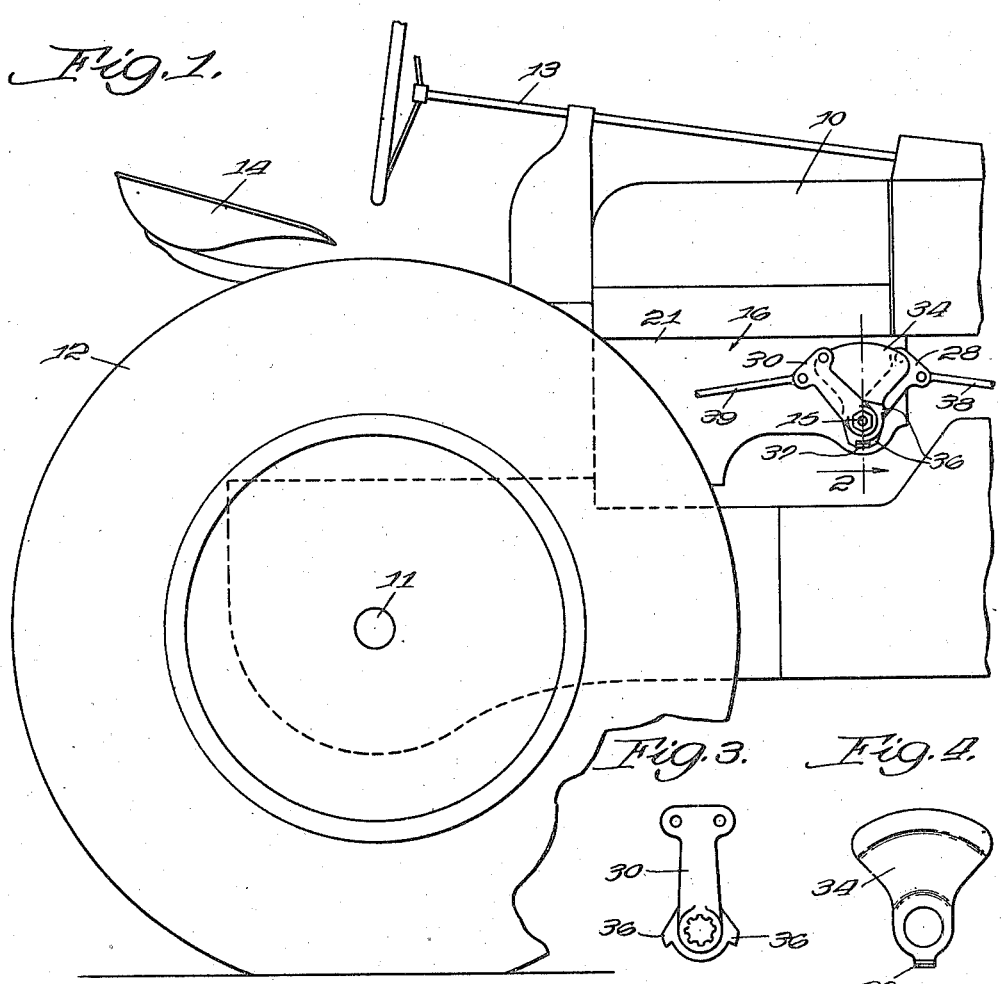
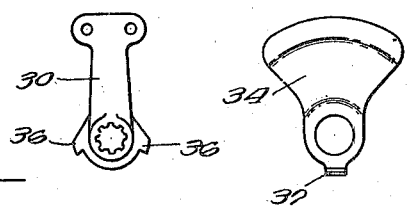
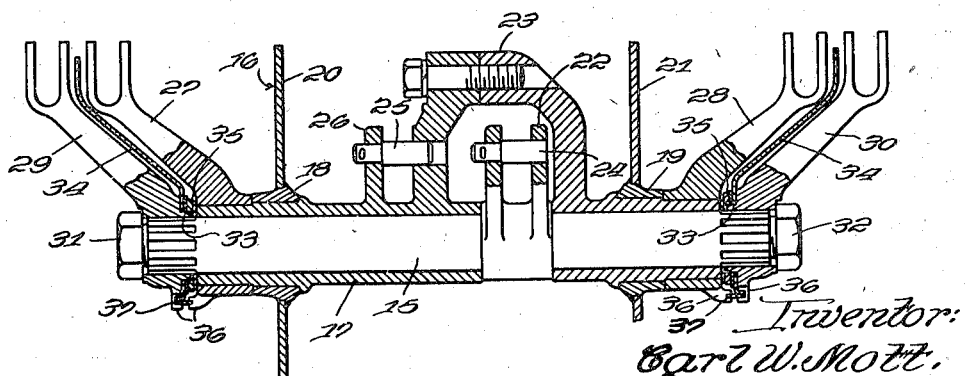
Inventor:
Carl W. Mott.
By Paul O. Pippel
Atty.

Patented May 4, 1948

2,440,780

UNITED STATES PATENT OFFICE 2,440,780

LIFTING DEVICE FOR TRACTORS

Carl W. Mott, La Grange, Ill., assignor to International Harvester Company, a corporation of New Jersey Application December 11, 1944, Serial No. 567,742

7 Claims. (Cl. 74—566)

This invention relates to lifting mechanism for agricultural implements. In United States Patent No. 2,368,156, a lifting mechanism is described including a transverse rock-shaft and a sleeve, independently rockable, and having arms secured to the ends thereof. The rock arms are postitioned at the sides of the tractor for forward and rearward movement and are adapted to be connected to agricultural implements to effect raising and lowering thereof. The arms at each side of the tractor lie closely together and, being independently rockable to opposite sides of a vertical center-line drawn through the axis thereof, each has occasion to cross the path of the other when raising and lowering implements and the like. Since the rock-shaft and sleeve are power operated, preferably through the intermediary of double acting hydraulic cylinders actuated from the tractor power plant, the rock arms function somewhat in the manner of powerful shears upon any object extending axially therebetween.

The danger of such an arrangement is obvious, and an object of the present invention is to provide means for rendering such arrangement innocuous.

Another object is to provide a shield between the arms, of such a shape as to occupy the triangular space described by the arms when rocked in opposite directions.

Another object is to provide a shield in the form of a segment mounted coaxially with the rock arms and pivotable independently thereof, one face of the segment being in juxtaposition with the arm on the rock-shaft and the other face with the arm on the sleeve throughout the range of movement of said arms.

A further object is to provide a frictionally held shield which is capable of pivotal movement but which is provided with an abutment engageable with stops on the arms to limit its movement relative thereto.

Other objects and advantages will become clear from the following detailed description when read in conjunction with the accompanying drawings wherein:

Figure 1 is a view in side elevation of the rear portion of a tractor and showing the mechanism of the present invention attached thereto;

Figure 2 is a vertical section taken on the line 2 of Figure 1;

Figure 3 shows one of the power lift rock arms; and

Figure 4 shows the protecting shield.

In the drawings is shown a tractor 10 having a rear axle 11 supporting rear drive wheels 12. The tractor is steered by a steering mechanism 13 accessible to an operator's seat 14.

Mounted upon the tractor and extending transversely thereof is a rock-shaft 15, which is partly enclosed within a housing 16 affixed to the tractor with its ends projecting laterally therefrom. Surrounding shaft 15 is a sleeve 17 which is journaled in bearings 18 and 19 in the side walls 20 and 21 of the housing 16.

The shaft 15 is rocked independently of the sleeve 17 by a mechanism which has been more fully described in United States Patent No. 2,368,156, above referred to. It is sufficient to say that the shaft 15 is provided with an arm 22 secured thereto, and that this arm is bridged at 23 by the sleeve 17. Arm 22 is provided with a pin 24 which may be connected to a source of power such as the piston of a double acting hydraulic cylinder, not shown, to effect rocking movement thereof. A pin 25 is likewise provided between a projection 26 and the bridge 23 for connection to a similar source of power for independently rocking the sleeve.

The ends of sleeve 17, projecting from the sides of the tractor, have secured thereto forwardly and rearwardly swingable rock arms 27 and 28. The ends of shaft 15 projecting from the ends of sleeve 17 are splined and have rock arms 29 and 30 removably secured thereto by nuts 31 and 32. Rock arms 27, 28 and 29, 30 are thus independently rockable by rocking the shafts 15 and 17 and these elements together form part of a power lift unit by which implements may be attached to the tractor for vertical movement. Arms 29 and 30 are provided with a recessed or restricted portion 33 serving as a bearing for the pivotal mounting of a protective shield or guard member 34, one being provided at each side of the tractor and between each pair of rock arms at the side thereof. Shield 34 is frictionally held in position between the pair of arms at each side of the tractor by a washer 35, and is capable of pivotal movement with respect to the rock arms and with respect to the shaft 15 and the sleeve 17.

As will be observed particularly well in Figure 1, where the arms 28 and 30 on the right side of the tractor are shown, and in Figure 3, each rock arm is provided at its lower portion with radially projecting lugs 36. Likewise as clearly indicated in Figures 2 and 4, shield 34 is provided at its base with an abutment portion in the form of a broadened shoulder 37 adapted to extend into the path of the lugs 36, as shown in Figure 2.

In Figure 1 the arms 28 and 30 are shown at opposite extremes of rocking movement, and shield 34 is shown as occupying the triangular space therebetween. In this position one lug 36 of each of the arms 28 and 30, respectively, contacts the shoulder 37 on opposite side thereof and prevents the relative movement of the shield 34 with respect to the rock arms. In other positions of the arms, as for example, where they are somewhat closer together, the lugs 36 likewise function as stops and permit only a very limited pivotal movement of the shield with respect to the arms, and in no position of the arms is the shield capable of being displaced from an overlapping position with respect to the rock arms, as is indicated in Figure 1. Thus, it is impossible for an object to extend transversely of the tractor between the arms 27 and 30 in any position thereof, and the danger of an operator getting a part of his body or a part of an implement, between the rock arms is prevented.

In Figure 1 the forwardly extending rock arm 28 is shown as connected to a rod 38, which may be connected in any suitable manner to a forwardly mounted agricultural implement. A similar rod 39 is connected to arm 30 and extends rearwardly therefrom for connection to a rearwardly mounted implement to effect raising and lowering thereof.

It will be noted from the drawings, particularly Figure 2, that the shield 34 is positioned between the pair of rock arms at each side of the tractor and lies closely adjacent thereto. Furthermore, it may be noted that throughout the range of movement of either of the pair of rock arms the shield is always in juxtaposition therewith and occupying the space therebetween.

The invention has been described in its preferred embodiment, and it should be understood that modifications may be made therein without departing from the spirit of the invention or the scope of the appended claims.

What is claimed is:

1. In a tractor to which may be attached an implement such as an earth-working tool or the like and having a power operated lifting unit for moving the implement with respect to the tractor, in combination, a pair of adjacent rock arms pivotally mounted on the tractor for independent rocking movement in parallel planes to opposite sides of a vertical center line, and a substantially stationary segmental shield having opposite faces in juxtaposition with said arms throughout the range of movement thereof and occupying substantially all of the space therebetween.

2. In a tractor to which may be attached an implement such as an earth-working tool or the like and having a power operated lifting unit for moving the implement vertically with respect to the tractor, in combination, a plurality of rock arms mounted coaxially on the tractor for independent rocking movement to opposite sides of a vertical center line through the pivot axis thereof, a segmental shield pivoted coaxially with said arms and adapted to occupy the space therebetween in any position thereof, and stops on said arms arranged to limit the relative pivotal movement of said shield.

3. In a tractor to which may be attached an implement such as an earth-working tool or the like and having a power operated lifting unit for moving the implement vertically with respect to the tractor, in combination, a pair of adjacent rock arms mounted on a common axis on one side of the tractor for independent rocking movement longitudinally of the tractor to opposite sides of a vertical center line through said axis, and a shield member having a substantially continuous surface arranged to occupy the space between said arms in the plane of rocking movement thereof and in any position of said arms.

4. In a tractor to which may be attached an implement such as an earth-working tool or the like and having a power operated lifting unit for moving the implement vertically with respect to the tractor, in combination, a pair of adjacent rock arms mounted on a common axis on one side of the tractor for independent rocking movement longitudinally of the tractor to opposite sides of a vertical center line through said axis, and a segmental shield member approximately coextensive with said arms occupying a position between said arms in the plane of rocking movement thereof and having substantially continuous opposite faces in juxtaposition with said arms throughout the range of movement thereof.

5. In a tractor to which may be attached an implement such as an earth-working tool or the like and having a power operated lifting unit for moving the implement vertically with respect to the tractor, in combination, a pair of adjacent rock arms mounted on a common axis on one side of the tractor for independent rocking movement longitudinally of the tractor to opposite sides of a vertical center line through said axis, a segmental shield member pivoted coaxially with said arms, said shield member having opposite faces in juxtaposition with said arms throughout the range of movement thereof, a shoulder on said shield, and stops on said arms arranged to limit the relative pivotal movement of said shield.

6. In a tractor to which may be attached an implement such as an earth-working tool or the like and having a lifting unit for moving the implement with respect to the tractor, in combination, a transverse rockshaft on the tractor, a sleeve on the rock-shaft and rockable with respect thereto, a rock arm on the shaft, a rock arm on the sleeve adjacent the rock arm on the shaft, said arms being independently rockable to opposite sides of a vertical center line through the axes thereof, a segmental shield coaxially mounted between said arms and pivotable independently thereof, the opposite faces of said shield being in juxtaposition with said arms throughout the range of movement thereof, and means for limiting the movement of said shield relative to said arms.

7. In a tractor to which may be attached an implement such as an earth-working tool or the like and having a lifting unit for moving the implement with respect to the tractor, in combination, a transverse rockshaft on the tractor extending to opposite sides thereof, a sleeve on said rock-shaft, a rock arm secured to said sleeve at each end thereof, a rock arm secured to each end of said shaft adjacent said sleeve rock arms and rockable independently thereof to opposite sides of a vertical center line through the axes thereof, a segmental shield coaxially mounted between the arms at each end of said sleeve and shaft, said shield being pivotable independently of said arms and having opposite faces in juxtaposition therewith throughout the range of movement thereof, a shoulder on said segment, and stops on said arms arranged to limit the relative movement of said shield.

CARL W. MOTT.

REFERENCES CITED

The following references are of record in the file of this patent:

UNITED STATES PATENTS

| Number | Name | Date |
|---|---|---|
| 2,097,058 | O'Connor | Oct. 19, 1937 |
| 2,163,962 | Pomernacki | June 27, 1939 |
| 2,292,091 | Rhodes | Aug. 4, 1942 |
| 2,368,176 | Orelind | Jan. 30, 1945 |